PULSE GENERATING CIRCUITS WHICH PROVIDE FOR RAPID RECOVERY OF THE DELAY LINE TIMING ELEMENT

Filed June 29, 1962 3 Sheets-Sheet 1

INVENTOR
G. A. VAN DINE
BY John K. Mullarney
ATTORNEY

March 23, 1965 G. A. VAN DINE 3,175,101

PULSE GENERATING CIRCUITS WHICH PROVIDE FOR RAPID RECOVERY OF THE DELAY LINE TIMING ELEMENT

Filed June 29, 1962

3 Sheets-Sheet 2

INVENTOR
G. A. VAN DINE
BY John K. Mullarney
ATTORNEY

March 23, 1965 G. A. VAN DINE 3,175,101

PULSE GENERATING CIRCUITS WHICH PROVIDE FOR RAPID RECOVERY OF THE DELAY LINE TIMING ELEMENT

Filed June 29, 1962 3 Sheets-Sheet 3

INVENTOR
G. A. VAN DINE
BY John K. Mullarney
ATTORNEY

United States Patent Office 3,175,101
Patented Mar. 23, 1965

3,175,101

PULSE GENERATING CIRCUITS WHICH PROVIDE FOR RAPID RECOVERY OF THE DELAY LINE TIMING ELEMENT

Gilbert A. Van Dine, Hanover Township, Morris County, N.J., assignor to Bell Telephone Laboratories, Incorporated, New York, N.Y., a corporation of New York Filed June 29, 1962, Ser. No. 206,515
19 Claims. (Cl. 307—88.5)

The present invention relates to pulse generating circuits, and more particularly to triggered transistor pulse generating circuits.

Many transistor pulse generating circuits have been proposed heretofore for the generation of pulses of predetermined width. The prior art circuits, however, appear to suffer from one or more disadvantages. For example, many prior art circuits employ an R-C timing network to determine the width of the output pulses. While such circuits are relatively simple in construction, the limits on the width of the output pulses are determined by the tolerances of at least several circuit components, including the resistance-capacitance combination and associated transistors. Other circuits utilize a delay line in order to obtain an accurate output pulse width but these often require point contact transistors, which, for a given current handling capacity, are not nearly as fast acting as junction transistors. Still other prior art circuits utilize a delay line and junction transistors, but these are limited in that a time interval equal to or greater than that of the output pulse width is required to allow the delay line to recover before a succeeding output pulse can be obtained.

It is accordingly a primary object of the present invention to provide an output pulse whose width is determined by a single circuit component, viz. a delay line, which may be chosen as a precision unit.

Another object is to provide a pulse generating circuit which combines the timing accuracy of a delay line with rapid recovery so that the output pulses may, if desired, be separated by a time interval of less than the output pulse width.

These and other objects are obtained in accordance with the present invention wherein a delay line is used as the pulse width determining element in transistor pulse generators advantageously utilizing junction transistors. The initial step of an applied triggering pulse initiates both the front edge of the output pulse and the propagation of a transient along the delay line. The transient wave propagates to the far end of the line, encounters an effectively open-circuited end, reflects therefrom as an equal amplitude in-phase wave, and then returns to the sending end of the line. The returning wave front serves to trigger a transistor back into conduction and in so doing terminates the output pulse.

A feature of the invention relates to means for reducing the required time interval between successive output pulses. A diode (or diodes) is connected to the delay line so as to be back-biased during the output pulse period and forward-biased during the time that the line is recovering or returning to its stable-state condition. As a result, the recovery of the delay line takes place in a period of time significantly shorter than the output pulse period.

Another feature of the present invention relates to a circuit configuration for producing an accurately timed output pulse of predetermined duration in response to an input triggering pulse of longer or shorter duration than said output pulse.

A further feature of the invention relates to the rise time of the trailing edge of the output pulse in the case where the input pulse is still present. The trailing edge rise time is dependent upon how rapidly the base-emitter junction capacitance can be charged. In the aforementioned R-C timing network type prior art circuits this junction capacitance is charged in parallel with the large capacitance of the R-C network. In the present case this junction capacitance is charged more rapidly by the reflected voltage step from a low impedance delay line.

Other objects and features of the invention will be more readily understood from the following detailed description taken in conjunction with the accompanying drawings in which.

Figure 4:
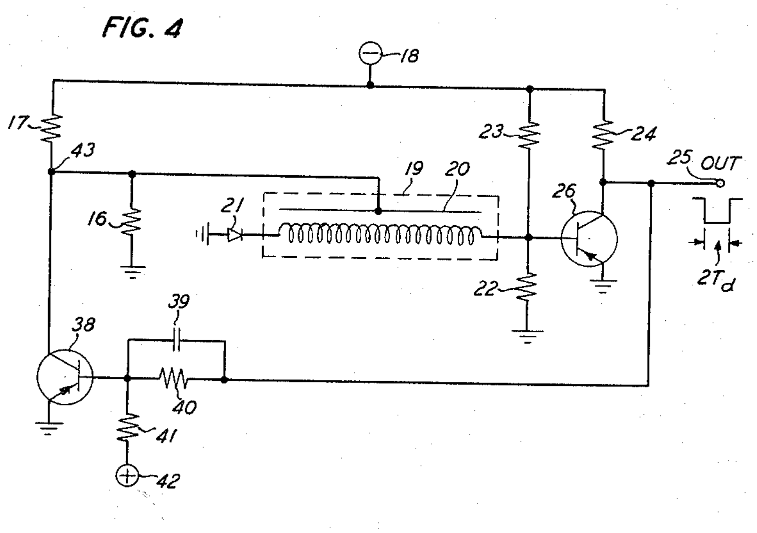
Figure 5:
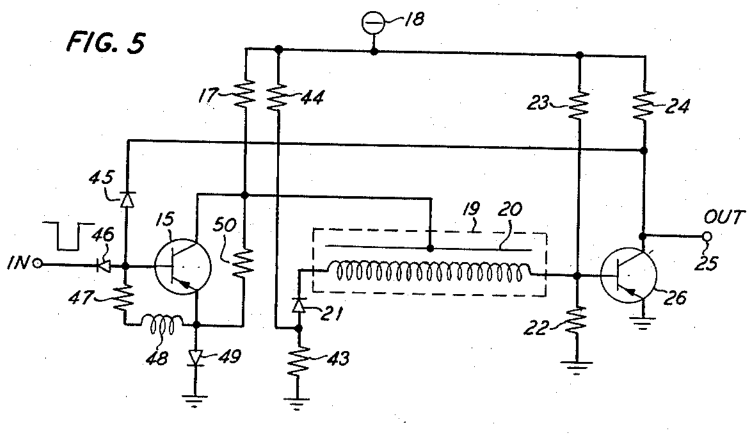
Figure 6:
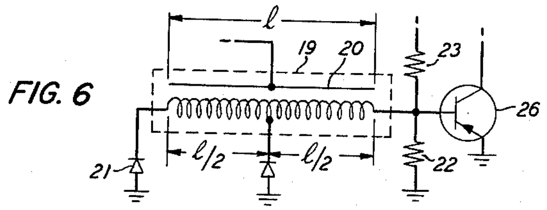
Figure 7:
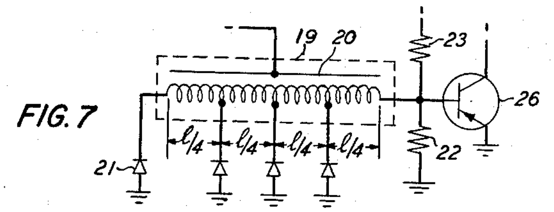

FIGS. 4 and 5 respectively represent further preferred embodiments of the invention; and FIGS. 6 and 7 illustrate a manner of achieving still further reduction in circuit recovery time.

Figure 1:
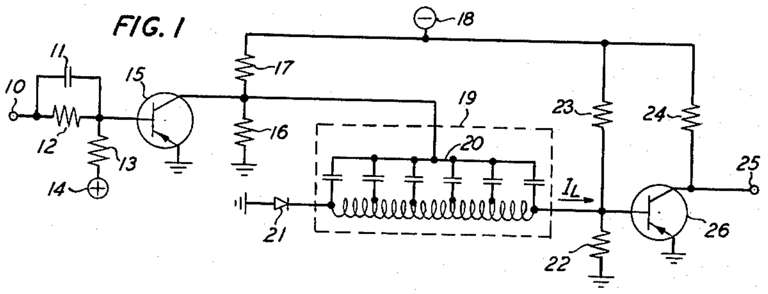
FIG. 1 is a schematic circuit diagram of a pulse generating circuit constructed in accordance with the principles of the present invention.

Referring now to FIG. 1 of the drawings, there are shown two PNP junction type transistors 15 and 26 each connected in a grounded emitter configuration. With no pulse applied to the input 10, transistors 15 and 26 will remain in a stable-state condition. The potential on the base of transistor 26 is determined by the biasing path from ground through resistors 22 and 23 to the minus potential source 18. This potential on the base of transistor 26 is sufficiently negative with respect to its emitter so as to place transistor 26 in a saturated "on" state. The junction point of resistors 22 and 23 is also connected to one end of the delay line 19. While the symbolic representation of a lumped parameter type delay line is illustrated in the figure it will be clear to those in the art that a distributed parameter delay line can also be advantageously used herein, and the invention is in no way limited to the type delay line utilized. The other end of delay line 19 is connected to the cathode of diode 21 whose anode is connected to ground.

In the stable condition when no transient exists on the delay line, the potential on the cathode of diode 21 will be substantially the same as that on the base of transistor 26. Although diode 21 is poled in the same direction, with respect to delay line 19, as is the base-emitter junction of transistor 26, it is desirable to not have the diode in conduction, that is, to not have the diode conducting an appreciable portion of the current flowing through resistor 23 during the aforementioned stable condition. The reason for this that it is necessary to insure a sufficient current into the base of transistor 26 to establish it in a saturated condition. Operation in this particular manner can be obtained in several ways. If diode 21 and transistor 26 are connected to the same reference potential (e.g., ground), as they are in FIGS. 1, 3, and 4, diode 21 may be so chosen as to have a higher junction barrier potential (forward breakdown potential) than that of the base-emitter junction of transistor 26. Practically, this may be accomplished by choosing a silicon diode and a germanium transistor.

However, if it is desirable to use a diode made of the same material and with the same junction barrier potential as the base-emitter junction of transistor 26, the anode of diode 21 may be connected to a reference potential which is slightly more negative than the reference potential to which the emitter of transistor 26 is connected. A circuit diagram of an embodiment which uses this technique is shown in FIG. 5.

The potential on the base of transistor 15 is determined by the biasing path from positive potential source 14 through resistors 13 and 12 to the input 10. This potential on the base of transistor 15 is sufficiently positive with respect to ground to keep transistor 15 in a nonconduction or "off" state when no pulse is being delivered to input 10. The collector of transistor 15 and the common 20 of the delay line are connected to the junction of resistors 16 and 17, which establishes a negative potential on the collector of transistor 15 and on common 20 by providing a current path from ground through resistors 16 and 17 to the minus potential source 18.

Figure 2:
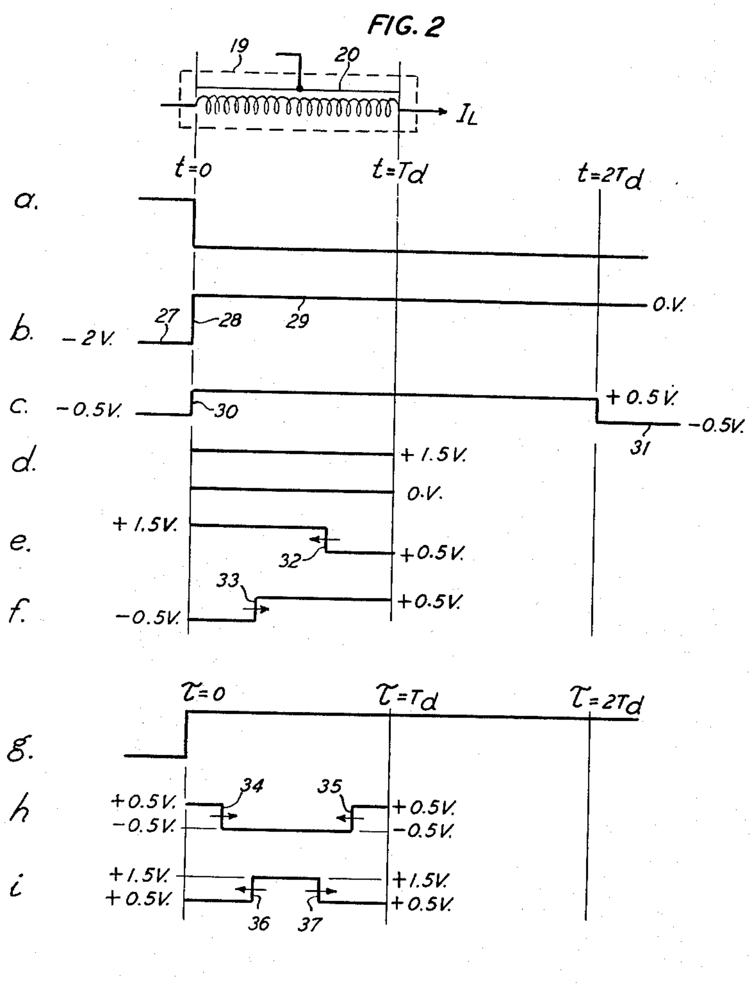
FIG. 2 illustrates certain waveforms useful in the explanation of the present invention.

In order to understand the operation of the circuit of FIG. 1, it is helpful to refer to the waveforms in FIG. 2. The explanation of the operation is divided into two parts: first, with the application to input 10 of a negative voltage step as shown in FIG. 2(*a*) which places transistor 15 in a saturated "on" state, and second, upon termination of this step as shown in FIG. 2(*g*) which returns transistor 15 to the "off" state. In order to facilitate an understanding of the existing relationships between the various waveforms of FIG. 2, voltage values are indicated and will be referred to in the discussion. It is to be understood, however, that the particular values chosen are for illustrative purposes only, and their absolute magnitudes are in no way critical.

Before the application of the negative voltage step to input 10 the potential of any point along delay line 19 with respect to common 20 is a constant value as shown by FIG. 2(*d*). Note, a given point on line 19 is positive, i.e., less negative, with respect to common. Now if at time, $t=0$, a negative voltage step is applied to input 10 and it is of sufficient magnitude to drive transistor 15 into conduction, the potential of common 20 with respect to ground will change rapidly, as shown in FIG. 2(*b*) by voltage step 28, from potential 27 which is determined by resistors 16 and 17 and negative potential source 18 to potential 29 which is determined by the collector-emitter resistance of transistor 12 when in a saturated condition. This latter potential approaches zero. However, the potential difference that exists along delay line 19 is unable to change instantaneously because of the capacitive effect exhibited by the line, and thus both ends of the delay line endeavor to rise in a positive direction by the magnitude of voltage step 28. At the remote end of the line, the voltage across diode 21 will rise by substantially the full magnitude of voltage step 28, and in so doing back-bias diode 21 and prevent current from flowing from delay line 19 through diode 21 to ground. On the other hand, the junction point between delay line 19 and the base of transistor 26 in attempting to rise the full magnitude of the voltage step 28 will cut off transistor 26, however, it will not rise the full amount of the aforementioned voltage step since current will flow through resistor 22 to ground and through resistor 23 to minus potential source 18.

The values of resistors 22 and 23 are chosen so as to approximately terminate the line in its characteristic impedance. Accordingly, substantially one-half of the voltage step 28 will appear across delay line 19 and the other half will appear between the base of transistor 26 and ground. The voltage step across delay line 19 is shown as a function of position along the line in FIG. 2(*e*) as voltage step 32, which progates toward diode 21; the voltage step between the base of transistor 26 and ground is shown in FIG. 2(*c*) as step 30. As a result of step 30, transistor 26 is cut off and the collector of transistor 26 drops in potential to form the initial step or leading edge of the output pulse.

After a time interval of $T_d$ (the one-way progagation time of delay line 19) subsequent to the initial voltage step of FIG. 2(*a*), the voltage step 32 will have traveled the entire length of the line. Diode 21 which is still back-biased will present a very high impedance to voltage step 32, and as a result, will cause a reflection of step 32 substantially as though the step had encountered an open circuit. The resulting reflected voltage step shown in FIG. 2(*f*) as voltage step 33 will propagate back toward the base of transistor 26 and terminate in the terminating characteristic impedance after another interval of $T_d$. Hence, after an interval of $2T_d$ subsequent to the initial step of FIG. 2(*a*), the current, $I_L$, from delay line 19, will cease flowing and the base of transistor 26 will be allowed to return as shown in FIG. 2(*c*) to potential 31, the same potential which existed on the base of transistor 26 prior to step 30. Transistor 26 thereby goes back into conduction.

Hence, the application of a negative step to input 10 of sufficient magnitude to put transistor 15 into conduction will cause a pulse to appear at output 25 with a pulse width equal to twice the one-way propagation time of delay line 19.

It will now be advantageous to investigate the behavior of the circuit in FIG. 1 after termination of the negative step at input 10. The time at which the input step is terminated has been designated as $\tau=0$ in contrast to the time at which the input step began, which was designated $t=0$.

At $\tau=0$, termination of the step at input 10, as shown in FIG. 2(*g*), will cause transistor 15 to return to cut off and the collector of transistor 15 to drop toward the negative potential determined by the current flowing from ground through resistors 16 and 17 to minus potential source 18. Since the potential difference across delay line 19 cannot change instantaneously as indicated heretofore, both ends of delay line 19 will endeavor to follow common 20 and in so doing cause diode 21 to conduct and the emitter-base junction of transistor 26 to conduct even more heavily. The resulting currents will flow from ground through diode 20 into one end of delay line 19 and from ground through the emitter-base junction of transistor 26 into the other end of delay line 19. These currents set up a voltage step in each end of delay line 19, as shown in FIG. 2(*h*) by steps 34 and 35, which propagate from their respective ends toward the center of delay line 19.

After a time interval of $T_{d/2}$ after $\tau=0$ steps 34 and 35 will meet at the center of delay line 19. Since the polarity and amplitude of each step is equal to that of the other, and since the steps are traveling in opposite directions, each step will be setting up currents equal and opposite to that of the other. Upon meeting, each step will be opposed by the other in setting up its respective current and will be unable to distinguish between meeting the other step and meeting an open circuit. Steps 34 and 35 will therefore reflect from the "virtual open" at the center and propagate back, as shown in FIG. 2(*i*) by steps 36 and 37 respectively, toward the ends of delay line 19. After another interval of $T_{d/2}$ subsequent to the reflection from the "virtual open" the steps 36 and 37 will terminate in the impedance composed of resistors 16 and 17 in parallel. This parallel combination should be substantially equal to one-half the characteristic impedance of delay line 19 since during this latter mode of operation the said parallel combination terminates the effectively paralleled halves of the delay line. Thus, the steps 36 and 37 will be properly terminated, the transient currents which were initiated at $\tau=0$ will cease, and the delay line will be recharged to the stable condition as shown in FIG. 2(*d*).

In concluding the discussion of the circuit of FIG. 1, it should be noted that application of a negative step to input 10 will result in a pulse of width $2T_d$ at output 25, whereas termination of the input step will result in virtually no change at output 25, but will return the circuit to its stable condition in a time interval of only $T_d$.

Figure 3:
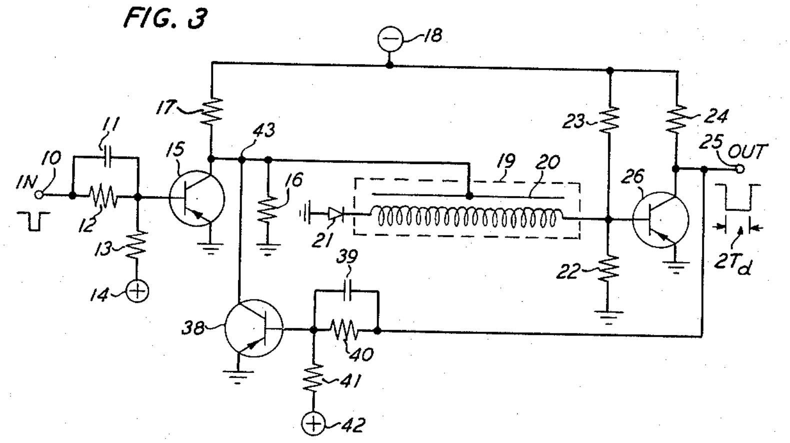
FIG. 3 is a schematic circuit diagram of a preferred embodiment for producing an accurately timed output pulse of selected duration in response to an input pulse of longer or shorter duration than said output pulse.

Referring now to FIG. 3, it is readily seen that the circuit is similar to the circuit in FIG. 1 except that a regenerative path has been added from the collector of transistor 26 to the collector of transistor 15. When transistor 26 is "on" or in conduction and the collector of transistor 26 is at a potential near ground, the potential on the base of transistor 38, which is determined by the bias path from positive potential source 42 through resistors 41 and 40 to the collector of transistor 26, is positive with respect to the emitter; transistor 38 is therefore cut off. However, when transistor 26 is turned off as heretofore described, the potential on the base of transistor 38 will go negative with respect to ground, and transistor 38 will thus be turned on. The speed with which transistor 38 is turned on or off after a change in transistor 26 is accelerated by capacitor 39.

When a negative pulse is applied at input 10, transistor 26 will cut off, transistor 38 will therefore be turned on and it will remain on for the $2T_d$ interval. If the input pulse is longer than $2T_d$, the recovery phase, during which delay line 19 returns to its stable condition, will not take place until the input pulse has terminated; in terms of the symbols used in FIG. 2, the time at which $t=2T_d$ is less than the time at which $\tau=0$. Although transistor 38 will always be turned off at an interval $2T_d$ subsequent to the start of the input pulse, the collector of transistor 38 which is connected to junction 43 will have virtually no effect on junction 43 since transistor 15 is still on at the time, and its collector will maintain junction 43 at a near ground potential. On the other hand, if the input pulse is shorter than $2T_d$, transistor 38 will turn on at the start of the input pulse and keep junction 43 at a near ground potential even though transistor 15 will have turned off at the termination of the input pulse. At an interval of $2T_d$ after the start of the input pulse, transistor 38 will turn off and immediately start the recovery phase; in terms of the symbols used in FIG. 2, the time at which $t=2T_d$ is equal to the time at which $\tau=0$. Thus, even should the input pulse be of a duration less than $2T_d$, the recovery operation does not begin until the output pulse terminates.

For the reasons given in the discussion of the circuit in FIG. 1, the recovery phase causes increased current to flow in the emitter-base junction of transistor 26. Consequently, when the input pulse is shorter than the output pulse, the recovery begins at the instant the output pulse terminates and hence transistor 26 will turn on more rapidly and a faster rise of the trailing edge of the output pulse will result.

Referring now to FIG. 4, the schematic representation of a pulse generator similar to that of FIG. 3 is shown except that the input transistor means for advantageously supplying input pulses to the delay line has been removed. Many possible ways of triggering the circuit of FIG. 4 into its quasi-stable state will be obvious to those skilled in the art; for example, pulses may be supplied to the base or collector of transistor 38, or a negative pulse with a time duration of less than $2T_d$ may be applied to output 25. In any case, the circuit will produce an output pulse with a time duration of $2T_d$ whereas the time required for the recovery of the delay line will be only $T_d$, the one-way propagation time of the delay line.

Referring now to FIG. 5, a circuit is shown wherein the diode may be of the same material as, and may have the same junction barrier potential (forward breakdown potential) as the base-emitter junction of transistor 26. The anode of diode 21, instead of being connected to the same reference potential as is the emitter of transistor 26, is connected to the junction of resistors 43 and 44 which provides a slight reverse bias on the diode in order to prevent the diode from competing with the base-emitter junction of transistor 26 for current through resistor 23 during the stable period. However, this reverse bias on diode 21 should not be so large as to prevent current flow through the diode during the recovery phase. It is also desirable for circuit balance purposes to have resistor 43 small in value as compared with the characteristic impedance of the delay line.

Additional circuit variations are shown in FIG. 5 in order to illustrate some of the many changes that may be made without departing from the spirit and scope of the present invention. For example, in FIG. 5 the regeneration from the collector of transistor 26 is provided through diode 45 instead of through a transistor stage as in FIG. 3. Zener diode 49, connected between the emitter of transistor 15 and ground, determines the input threshold level. The latter is important in case the base of transistor 15 is diode coupled, as shown by diode 46, to a driving stage.

During the output pulse period, inductor 48 stores energy which is used to turn off transistor 15 when the output pulse terminates and current ceases to flow through diode 45.

As will be clear to those in the art, the number of diodes connected between delay line 19 and ground need not be limited to one. FIGS. 6 and 7 illustrate additional diode-delay line configurations which provide further reductions in recovery time. In either case the width of the output pulse remains at $2T_d$, but the recovery time is changed to $T_{d/n}$ where $n$ is equal to the number of diodes used. Either of these configurations, or one with a larger number of diodes, can be utilized to advantage in any one of the circuits shown in FIGS. 1, 3, 4, and 5.

While the transistors employed have been shown and described as PNP junction transistors, it is obvious that NPN junction transistors are equally suitable so long as the polarities of the direct-current potential source and the direction of easy current flow of the diode or diodes are reversed. It is to be understood therefore that the above-described arrangements are illustrative of the application of the principles of the present invention. Numerous other arrangements may be devised by those skilled in the art without departing from the spirit and scope of the invention.

What is claimed is:

1. A pulse generator comprising a transistor having an input electrode, an output electrode and a common electrode, means for connecting said common electrode to a reference potential, means for normally biasing said transistor into conduction, a delay line having one end connected to said input electrode, input means for delivering pulses of a duration of at least twice the one-way propagation time of said delay line, said delay line having its common terminal connected to said input means, and a diode having one terminal connected to the other end of said delay line with the other terminal thereof connected to a reference potential, the poling of said diode with respect to said delay line being the same as the input-common electrode path of said transistor.

2. A pulse generator as described in claim 1 wherein said reference potentials are the same and said diode has a higher junction barrier potential than said input-common electrode path.

3. A pulse generator comprising a transistor having an input electrode, an output electrode, and a common electrode, means for connecting said common electrode to a reference potential, means for biasing said transistor into conduction, a delay line having one end connected to said input electrode, input means for delivering pulses of a duration at least twice the one-way propagation time of said delay line, said delay line having its common terminal connected to said input means, and a diode having one terminal connected to the other end of said delay line and having the other terminal connected to said reference potential, the poling of said diode with respect to said delay line being the same as the input-common electrode path of said transistor.

4. A pulse generator as described in claim 3 wherein said diode has a higher junction barrier potential than said input-common electrode path.

5. A pulse generator comprising a transistor having an input electrode, an output electrode, and a common electrode, means for connecting said common electrode to reference potential, means for biasing said transistor into conduction, a delay line having one end connected to said input electrode, a diode having one terminal connected to the other end of said delay line and having the other terminal coupled to said reference potential, the poling of said diode with respect to said delay line being the same as the input-common electrode path of said transistor, and regenerative coupling means interconnecting the output electrode of said transistor and the common terminal of said delay line.

6. A pulse generator as described in claim 5 wherein said diode has a higher junction barrier potential than said input-common electrode path.

7. In a combination, a pair of transistors each having a base, emitter and collector electrodes connected in common emitter configuration, means for biasing one of said transistors into conduction and the other of said transistors into nonconduction, means for regeneratively coupling the output of said one transistor to one of the electrodes of said other transistor, a delay line having its common terminal connected to the collector of said other transistor and having one of its ends connected to the base of said one transistor, a diode having one terminal connected to the other end of said delay line and having the other terminal coupled to a point of reference potential, the poling of said diode with respect to said delay line being the same as that of the base-emitter path of said one transistor.

8. The combination as described in claim 7 including means for coupling an input triggering pulse to the base of said other transistor.

9. A monostable multivibrator comprising a pair of transistors each having a base, emitter and collector electrodes connected in common emitter configuration, means for biasing one of said transistors into conduction and the other of said transistors into nonconduction, means for regeneratively coupling the collector of said one transistor to the base of said other transistor, a delay line having its common terminal connected to the collector of said other transistor and having one of its ends connected to the base of said one transistor, a diode having one terminal connected to the other end of said delay line and having the other terminal coupled to a point of reference potential, the poling of said diode with respect to said delay line being the same as that of the base-emitter path of said one transistor.

10. A monostable multivibrator as described in claim 9 wherein means are provided for coupling an input triggering pulse to one of the electrodes of said other transistor.

11. A pulse producing circuit comprising a pair of transistors each having a base, emitter and collector electrodes connected in common emitter configuration, means for normally biasing one of said transistors into conduction and the other into nonconduction, a delay line having its common terminal connected to the collector of said other transistor and one of the ends thereof connected to the base of said one transistor, diode means having one terminal connected to the other end of said delay line and the other terminal connected to a point of reference potential, the poling of said diode means with respect to said delay line being such that the direction of easy current flow therethrough is the same as that of the base-emitter path of said one transistor, said diode means having a forward breakdown potential that is greater than that of said base-emitter path, and means for coupling an input triggering pulse to said other transistor.

12. A pulse producing circuit as defined in claim 11 wherein said diode means comprises a diode having a higher junction barrier potential than said base-emitter path.

13. A pulse producing circuit as defined in claim 11 wherein said diode means comprises a diode and a resistance connected in series, and means for applying a diode back-biasing potential to the junction of said diode and resistance.

14. A monostable multivibrator comprising a pair of transistors each having a base, emitter and collector electrodes connected in common emitter configuration, means for normally biasing one of said transistors into conduction and the other into nonconduction, a delay line having its common terminal connected to the collector of said other transistor and one of the ends thereof connected to the base of said one transistor, diode means having one terminal connected to the other end of said delay line and the other terminal connected to a point of reference potential, the poling of said diode means with respect to said delay line being such that the direction of easy current flow therethrough is the same as that of the base-emitter path of said one transistor, said diode means having a forward breakdown potential which is greater than that of said base-emitter path, and means for regeneratively coupling the output of said one transistor to one of the electrodes of said other transistor.

15. A monostable multivibrator as defined in claim 14 wherein said regenerative coupling means comprises a third transistor having a base, emitter and collector electrodes and connected in common emitter configuration with the base thereof connected to the output of said one transistor and the collector connected to the collector of said other transistor, and means for biasing said third transistor to render the same nonconductive except during the output pulse period.

16. A monostable multivibrator as defined in claim 14 wherein said regenerative coupling means comprises a diode interconnected between the output of said one transistor and the base of said other transistor, said diode being normally nonconductive except during the output pulse period.

17. In combination, a pair of transistors each having a base, emitter and collector electrodes connected in common emitter configuration, means for normally biasing one of said transistors into conduction and the other into nonconduction, a delay line having its common terminal connected to the collector of said other transistor and one of the ends thereof connected to the base of said one transistor, diode means having one terminal connected to the other end of said delay line and the other terminal connected to a point of reference potential, the poling of said diode means with respect to said delay line being such that the direction of easy current flow therethrough is the same as that of the base-emitter path of said one transistor, said diode means having a forward breakdown potential that is greater than that of said base-emitter path, means for regeneratively coupling the output of said one transistor to one of the electrodes of said other transistor, and means for coupling an input triggering pulse to one of the electrodes of said other transistor.

18. A combination as defined in claim 17 including at least a second similar diode means similarly poled with one terminal thereof connected to said delay line at a point intermediate its ends and the other terminal connected to said point of reference potential.

19. A combination as defined in claim 18 including additional similar diode means interconnected between selected points in said delay line and said point of reference potential, said additional diode means being poled in a manner similar to the aforementioned diode means.

No references cited.

ARTHUR GAUSS, *Primary Examiner.*